(12) United States Patent
Lee et al.

(10) Patent No.: US 8,197,779 B2
(45) Date of Patent: Jun. 12, 2012

(54) CATALYST FOR REMOVING NITROGEN OXIDES FROM EXHAUST GAS, METHOD FOR PREPARING THE SAME AND METHOD FOR REMOVING NITROGEN OXIDES USING THE SAME FROM EXHAUST GAS

(75) Inventors: Ju-hyung Lee, Seoul (KR); In-sik Nam, Gyeongsangbuk-do (KR); Seong-moon Jung, Daejeon (KR); Jong-sik Choi, Daejeon (KR); Sun-joo Kim, Daejeon (KR); Hyuk-jae Kwon, Gyeongsangbuk-do (KR); Young-jin Kim, Ulsan (KR); Joon-hyun Baik, Seoul (KR)

(73) Assignee: LG Hausys, Ltd., Seoul (KR)

( * ) Notice: Subject to any disclaimer, the term of this patent is extended or adjusted under 35 U.S.C. 154(b) by 75 days.

(21) Appl. No.: 12/452,390

(22) PCT Filed: Jan. 8, 2009

(86) PCT No.: PCT/KR2009/000088
§ 371 (c)(1),
(2), (4) Date: Dec. 29, 2009

(87) PCT Pub. No.: WO2010/079854
PCT Pub. Date: Jul. 15, 2010

(65) Prior Publication Data
US 2011/0165049 A1    Jul. 7, 2011

(51) Int. Cl.
*B01J 23/00*    (2006.01)
*B01J 21/00*    (2006.01)
*B01J 20/00*    (2006.01)
*B01J 29/00*    (2006.01)
*B01D 53/00*    (2006.01)
*B01J 8/00*    (2006.01)
*C01B 21/00*    (2006.01)

(52) U.S. Cl. ............ 423/239.1; 502/242; 502/247; 502/350; 502/351; 502/353; 502/527.14; 502/527.24

(58) Field of Classification Search .......... 502/242, 502/247, 350, 351, 353, 527.14, 527.24
See application file for complete search history.

(56) References Cited

U.S. PATENT DOCUMENTS
6,265,342 B1    7/2001    Lim et al.
6,858,193 B2    2/2005    Ruwisch et al.

FOREIGN PATENT DOCUMENTS
KR    10-2009-0041898    4/2009
WO    WO 2007/049851    5/2007

*Primary Examiner* — Cam N. Nguyen
(74) *Attorney, Agent, or Firm* — McKenna Long & Aldridge LLP

(57) ABSTRACT

The present invention relates to a catalyst for removing nitrogen oxides from an exhaust gas, a method for preparing the same and a method for removing nitrogen oxide in an exhaust gas using the same, and more particularly, to a catalyst for removing nitrogen oxides from the exhaust gas in which a ceramic fiber carrier is treated by hydrothermal reaction prior to washcoating to improve the hydrothermal stability of catalyst, a method for preparing the same and a method for removing nitrogen oxide in an exhaust gas using the same. The catalyst prepared according to the present invention has excellent hydrothermal stability and an activity of the catalyst remains for a long time. Further, by using this catalyst to remove nitrogen oxides in an exhaust gas, a removal ratio of the nitrogen oxides is greatly enhanced.

16 Claims, 1 Drawing Sheet

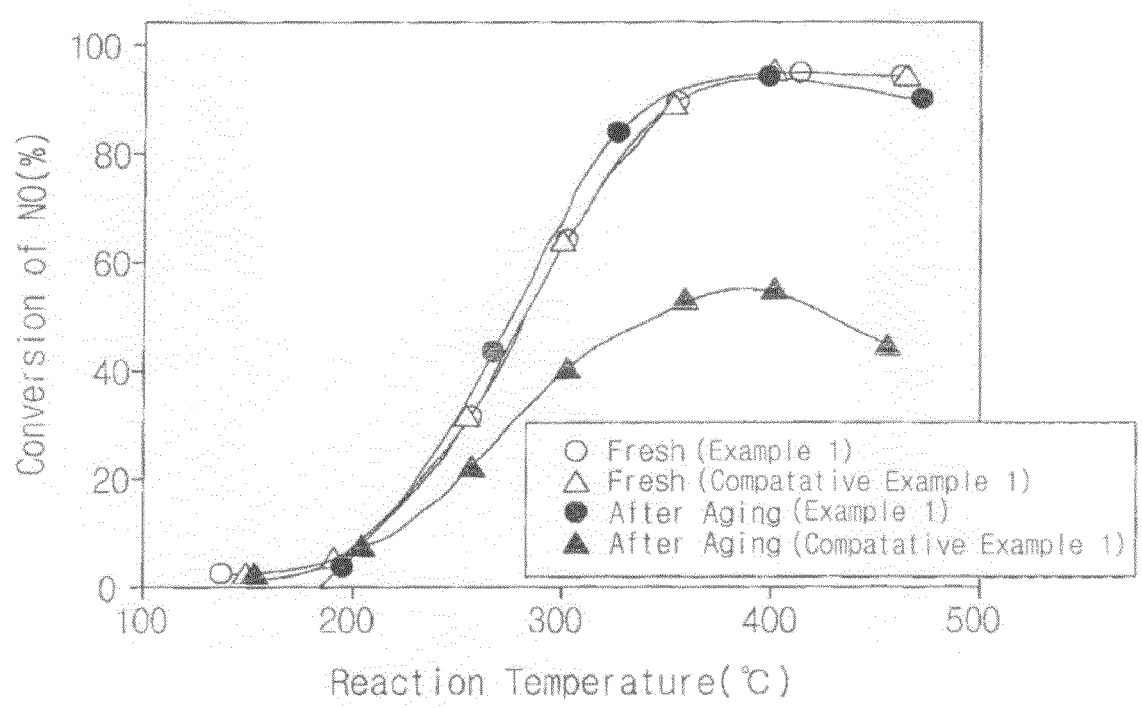

CATALYST FOR REMOVING NITROGEN OXIDES FROM EXHAUST GAS, METHOD FOR PREPARING THE SAME AND METHOD FOR REMOVING NITROGEN OXIDES USING THE SAME FROM EXHAUST GAS

CROSS-REFERENCE(S) TO RELATED APPLICATIONS

The present application is a national phase entry under 35 U.S.C. 371 of International Application PCT/KR2009/000088 filed on Jan. 8, 2009. The disclosures of said applications are incorporated by reference herein.

TECHNICAL FIELD

The present invention relates to a catalyst for removing nitrogen oxides from an exhaust gas, a method for preparing the same and a method for removing nitrogen oxides in an exhaust gas using the same, and more particularly, to a catalyst for removing nitrogen oxides from an exhaust gas in which a ceramic fiber carrier is treated by hydrothermal reaction prior to washcoating to improve the hydrothermal stability of catalyst, a method for preparing the same and a method for removing nitrogen oxide in an exhaust gas using the same.

BACKGROUND ART

Diesel vehicles tend to be increasingly sold due to excellent energy efficiency and power. However, the diesel vehicles exhaust larger amounts of particulate matters (PM) and nitrogen oxides ($NO_x$) as compared to gasoline vehicles and are a cause of the pollution in a metropolis. In particular, a regulation for the nitrogen oxides that causes ill and environmental pollution has been strengthened more and more and there has been tried many efforts to develop a technologies for removal thereof.

As the most effective method for the removing the nitrogen oxides, a selective catalytic reduction (SCR) is come into a spotlight, in which various reducing agents and catalysts can be employed according to various conditions such as properties of the applied process, environmental aspects and economics. Since a selective catalytic reduction by ammonia ($NH_3$/SCR), which is most effective for removing the nitrogen oxides in a stationary source such as a power plant and an incinerator and is being commercially used, has a problem resulted from store/transportation and use of the ammonia, urea which can be cracked to produce the ammonia is used for the removing the nitrogen oxides in the exhaust gas from the vehicles. The method for using the urea as a reducing agent is studied recently and largely for a post-treatment apparatus in diesel vehicles, and is actually commercialized in Europe.

However, one important problem in application of this technology into vehicles is a carrier used in a catalytic converter capable of carrying the catalyst. A ceramic cordierite carrier developed by Corning in 1975 is now used by at least 95% in the catalytic converter for the vehicles across the world. However, lighter frame and parts for the vehicle are required in an aspect of fuel efficiency and the weight of the cordierite carrier used as the catalyst carrier can also be a problem. To challenge this problem, lighter material of a noble concept has been studied.

Korean patent published application Nos. 10-2007-0013206 and 10-2007-0012243 disclose methods of fabricating a ceramic fiber filter for use as a diesel particulate filter for removing particulate matters exhausted from the diesel vehicles, and the ceramic fiber filter is expected to be very useful since it has a high porosity (at least 80%), is resistive to heat and impact due to unique elasticity of the fiber and can be formed into various shapes. Therefore, it is important to study whether technical development of the catalyst carrier using the ceramic fiber can replace the existing cordierite carrier or not.

Further, the object of the present invention is to develop a catalyst for removing the nitrogen oxides and a carrier for the same, with an excellent stability, which not only have a high initial efficiency of NOx removal but also can maintain the initial activity even after a long term operation under humid environment.

DISCLOSURE OF THE INVENTION

It is an aspect of the present invention, to overcome the above problems of the conventional art, is to provide a catalyst for removing nitrogen oxides from the exhaust gas with excellent hydrothermal stability.

It is another aspect of the present invention to provide a method for preparing the catalyst for removing nitrogen oxides from the exhaust gas with excellent hydrothermal stability.

It is further another aspect of the present invention to provide a method for removing nitrogen oxides in the exhaust gas using the catalyst with excellent hydrothermal stability.

The above aspects and other aspects can be achieved by the following embodiments of the present invention.

To achieve the above aspects, the present invention provides a catalyst for removing nitrogen oxides from the exhaust gas, wherein a washcoat having a vanadia/titania catalyst is coated on a ceramic fiber carrier treated by hydrothermal reaction.

Also, the present invention provides a method for preparing a catalyst for removing nitrogen oxides, comprising the following steps:

a first step preparing a ceramic fiber carrier treated by hydrothermal reaction;

a second step of preparing an aqueous washcoat solution by mixing vanadia/titania catalyst slurry and a aqueous binder solution; and a third step of preparing a washcoated ceramic fiber carrier by impregnating the ceramic fiber carrier treated by hydrothermal reaction in the prepared aqueous washcoat solution.

Further, the present invention provides a method for removing nitrogen oxides in an exhaust gas, comprising the following steps:

mixing an exhaust gas comprising nitrogen oxides with a reducing agent; and removing the nitrogen oxides by reduction reaction generated during passing the mixed component through a catalytic reactor employing a catalyst according to the present invention.

Hereinafter, the present invention will be described in detail.

The present inventors have been able to induce more stable carrier through a process preparing a ceramic fiber carrier treated by hydrothermal reaction before coating the ceramic fiber carrier with catalyst as the result of studies for solving the conventional problems, and have developed on the basis thereof a method for increasing a hydrothermal stability of a washcoated catalyst. This allows that the catalyst can be stably used for a long time.

That is, in a selective catalyst reduction process for removing nitrogen oxides from the exhaust gas, thermal stability of the catalyst coated on a ceramic fiber carrier is improved by hydrothermal-treating the ceramic fiber carrier before coating the ceramic fiber carrier with a catalyst.

In the catalyst for removing nitrogen oxides according to the present invention, the ceramic fiber carrier treated by hydrothermal reaction is coated with a washcoat comprising a vanadia/titania catalyst.

A removal ratio of the nitrogen oxides using the catalyst according to the present invention is in the range of 80 to 95% at a reaction temperature of 300 to 500° C.

Specifically, a method for preparing a catalyst for removing nitrogen oxides from the exhaust gas according to the present invention will be described.

The ceramic fiber carrier used in the present invention is treated by hydrothermal reaction first before impregnation in an aqueous washcoat solution comprising the catalyst, wherein the fiber carrier is prepared by a method disclosed in Korean patent application publication Nos. 10-2007-0013206 and 10-2007-0012243.

That is, the ceramic fiber carrier is prepared through the following steps: (a) firstly coating a ceramic green paper prepared using a slurry solution comprising ceramic fibers having a length of 0.1 to 10 mm with an aluminum silicate solution and drying the coated ceramic green paper; (b) secondly coating the dried ceramic green paper with an aluminum phosphate solution and drying the coated ceramic green paper; and (c) calcinating the ceramic green paper secondly coated and dried.

The ceramic fiber should be made of material capable of resisting a high temperature of at least about 1,200° C., and can employ one comprising one or more alumina or silica.

The ceramic green paper can be prepared using a paper preparation method which is conventionally used in the art, and the slurry solution used in the ceramic paper preparation comprises organic fibers besides the ceramic fibers and can further include a small amount of an organic binder.

Also, it is preferred that the aluminum silicate solution comprises C1-C6 lower alcohol, aluminum nitrate, tetraalkyl, orthosilicate and hydrochloric acid.

Also, it is preferred that the aluminum phosphate solution includes aluminum nitrate and phosphoric acid.

The process for coating the ceramic green paper using the aluminum silicate and aluminum phosphate solutions can be conducted by impregnation or injection, but not particularly limited thereto.

It is preferred that the step of calcinating the ceramic green paper is conducted at a temperature of 400 to 1,100° C. in vacuum, inert gas or air.

The hydrothermal reaction of the ceramic fiber carrier prepared as described above according to the present invention is conducted at a temperature of 300 to 900° C. When the temperature is less than 300° C., there is a problem that the effect of the hydrothermal reaction cannot be confirmed. On the contrary, when the temperature is more than 900° C., there is a risk of destroy of the ceramic fiber carrier structure, but the actual temperature of the vehicle exhaust gas is not increased to 900° C.

Further, the hydrothermal reaction is conducted for 1 to 72 hours. When the treatment time is less than 1 hour, there is a problem that the effect of the hydrothermal reaction cannot be confirmed across the carrier due to the too short treating time. On the contrary, when the treatment time is more than 72 hours, increase in improving effect according to the treating time is not observed.

Furthermore, the hydrothermal reaction is conducted under an air atmosphere comprising 0.1 to 50% of steam. When the steam of less than 0.1% is contained in the air, there can be caused a problem of the hydrothermal reaction due to insufficient steam. On the contrary, when the steam is more than 50%, there occurs a problem that an adhesiveness of the ceramic fiber carrier itself is weakened due to the high steam and the actual content of the steam in the exhaust gas is not more than maximum 50%.

The ceramic fiber carrier treated by hydrothermal reaction is dried at room temperature or a temperature of 200° C., and then coated with the washcoat which is prepared later and includes the catalyst.

After that, the aqueous washcoat solution, a catalyst activating component, is prepared by mixing vanadia/titania catalyst slurry and an aqueous binder solution.

The vanadia/titania catalyst is a catalyst that shows an efficient activity in a selective reduction reaction of the nitrogen oxides by ammonia in a stationary source, and can be applied to a mobile source. It is most preferred that vanadium, an activation material in the catalyst is contained in 1 to 3% by weight. When the content of the vanadium is up to 1%, it is difficult to expect a high activity in up to 1% by weight. On the contrary, when the content of the vanadium is at least 3% by weight, there is a problem that the activity of the selective reduction reaction is decreased due to ammonia oxidation reaction at a high temperature.

A commercialized impregnation method is used as the method for preparing the catalyst. After a calculated amount of ammonium-vanadate is dissolved in distilled water at 60 to 70° C. so that the vanadium is carried therein, the solution is adjusted to pH 2.5 to 3.0 using oxalic acid $((COOH)_2)$ and then mixed with $TiO2$, followed by impregnation and dry, followed by calcinating for 5 hours at 500° C. By adjusting the % by weight of the vanadium as described above, the catalyst is prepared.

The vanadia/titania catalyst slurry and the aqueous binder solution are mixed in a weight ratio of 1:1 to 1:7. When the weight ratio is less than 1:1, there is adhesiveness problem occurs upon coating of the slurry. On the contrary, when the weight ratio is more than 1:7, there is a problem that a content of the binder upon the coating is enlarged to lower an activation point of the catalyst.

At this time, the vanadia/titania catalyst slurry is prepared by mixing the catalyst and distilled water in a weight ratio of 1:1 to 1:7. When the weight ratio is less than 1:1, the catalyst with a high viscosity is prepared due to too much amount of the catalyst and this causes a problem of blocking cells of the carrier as a large amount of the slurry is coated at once. On the contrary, when the weight ratio is more than 1:7, there is a problem that a concentration of the catalyst in the slurry is lowered due to the small amount of the catalyst.

Also, the aqueous binder solution is prepared by mixing binder and distilled water in a weight ratio of 1:5 to 1:10. When the weight ratio is less than 1:5, there is a problem that a viscosity of the aqueous binder solution is raised due to a large amount of the binder and a large amount is coated at once. On the contrary, when the weight ratio is more than 1:10, there is a problem that a viscosity of the aqueous binder solution is lowered and the catalyst is not easily coated upon the coating of the catalyst.

The aqueous binder solution used in the present invention is prepared using alumina sol.

After that, the ceramic fiber carrier treated by hydrothermal reaction is impregnated in the prepared aqueous washcoat solution to prepare the washcoated ceramic fiber carrier. In this step, the ceramic fiber carrier is dipped in the aqueous washcoat solution and is then coated using an air gun so that the cells of the monolith ceramic fiber carrier are not blocked.

The washcoated ceramic fiber carrier includes 1 to 40% by weight of the carried washcoat. When at least 40% by weight of the washcoat is included, the cells of the carrier are narrowed and blocked.

The washcoated ceramic fiber carrier is cured for 1 to 24 hours in the range of 400 to 600° C. under air atmosphere to thereby complete the preparation of the catalyst for removing nitrogen oxides from the exhaust gas according to the present invention.

The present invention further provides a method for removing nitrogen oxides in the exhaust gas using the catalyst prepared according to the present invention.

That is, the method for removing nitrogen oxides in an exhaust gas includes the following steps: mixing the exhaust gas comprising nitrogen oxides with a reducing agent; and removing the nitrogen oxides by reduction reaction generated from the mixed component passed through a catalytic reactor employing a catalyst according to the present invention.

At this time, ammonia or urea is used as the reducing agent and the amount of the used ammonia or urea can be suitably adjusted according to an amount and a concentration of the nitrogen oxides to be removed.

A designed and installed a continuous type fixed bed reactor removes the nitrogen oxides through the reduction reaction on the catalyst surface as the exhaust gas comprising the nitrogen oxides diffuses to the coated catalyst while passing through each cell of the catalyst reactor.

First, when the ammonia is used as the reducing agent, a reaction formula is as follows:

$$4NO+4NH_3+O_2 \rightarrow 4N_2+6H_2O \tag{1}$$

Also, when the urea is used as the reducing agent, the reaction formula is as follows:

$$2NH_2-CO-NH_2+4NO+O_2 \rightarrow 4N_2+4H_2O+2CO_2 \tag{2}$$

Through the above main reaction, the nitrogen oxides react with the reducing agent such as ammonia or urea, and are converted into unharmful nitrogen.

Also, the reduction reaction is conducted under a space velocity of 100 to 100,000 $h^{-1}$ and a temperature of 150 to 600° C. It is most preferred in a removal efficiency of nitrogen oxide when the reduction reaction is conducted under the above condition. As a result of the reduction reaction, the nitrogen oxides in the exhaust gas are reduced to the nitrogen and water and thus removed.

The nitrogen oxide removal ratio according to the present invention is in the range of 80 to 95% at a reaction temperature of 300 to 500° C.

BRIEF DESCRIPTION OF THE DRAWINGS

FIG. 1 is a graph showing a removal ratio of a nitrogen monoxide according to a reaction temperature according to Example 1 of the present invention and Comparative Example 1, respectively.

BEST MODE FOR CARRYING OUT THE INVENTION

Practical and presently preferred embodiments of the present invention are illustrative as shown in the following Examples. However, it will be appreciated that those skilled in the art, on consideration of this disclosure, may make modifications and improvements within the spirit and scope of the present invention.

EXAMPLES

Example 1

Method for Preparing Catalyst for Removing Nitrogen Oxides from an Exhaust Gas A ceramic fiber carrier (prepared by LG chemical) with a cell size of a 200 CPSI was treated by hydrothermal reaction for 24 hours at 700° C. under an air atmosphere comprising 10% of steam, and then dried for 5 hours at 110° C. Also, as a catalyst for preparing a washcoat, a vanadia/titania catalyst comprising 2% by weight of vanadium was prepared with a size up to 200 mesh. The washcoat was prepared by mixing a catalyst slurry and an aqueous binder solution in a weight ratio of 1:4 and stifling the mixture for 12 hours. At this time, the catalyst slurry was prepared by mixing the catalyst and distilled water in a weight ratio of 3:7 and the aqueous binder solution was prepared by mixing a binder and distilled water in a weight ratio of 1:9. As the binder, alumina sol was used.

The prepared washcoat was coated on the ceramic fiber carrier treated by hydrothermal reaction. A dipping was used to coat the ceramic fiber carrier: the ceramic fiber carrier was dipped in the washcoat solution and then dried, wherein an air gun was used so that the monolith cells are coated without blocked. This process was repeated four to six times. The washcoated ceramic fiber carrier was cured for 5 hours at 500° C. under an air atmosphere, to prepare a monolith catalytic reactor coated with 20% by weight (1.1 g) of the washcoat for the weight of the carrier.

Method for Removing Nitrogen Oxides in an Exhaust Gas (1) Experiment for Showing Initial Activity of Catalyst (Fresh) 500 ppm of nitrogen monoxide (NO), 500 ppm of ammonia ($NH_3$), 5% of oxygen ($O_2$) and 10% of water ($H_2O$) are mixed, and then the mixed gas composition was passed through the prepared catalytic reactor. At this time, in an inside of the reactor, reduction reaction was conducted at a space velocity of 10,000 $h^{-1}$ and a temperature range of 150 to 500° C. The resulting removal ratio (%) of the nitrogen oxides according to a reaction temperature of the catalyst is shown in FIG. 1 (Fresh).

(2) Experiment for Showing Activity of Catalyst after Long Term Operation (after Aging)

Also, in order to measure a hydrothermal stability of the catalyst, the prepared catalytic was treated by hydrothermal reaction for 24 hours at 700° C. under an air atmosphere comprising 10% of steam and then the removal ratio (%) of the nitrogen oxides according to a reaction temperature of the catalyst was measured again, the result of which is shown in FIG. 1 (After Aging).

Comparative Example 1

Method for Preparing Catalyst for Removing Nitrogen Oxides from an Exhaust Gas A catalytic reactor coated with about 1.1 g of the washcoat was prepared by the same manner as Example 1, except that the ceramic fiber carrier is not treated by hydrothermal reaction before the washcoating.

Method for Removing Nitrogen Oxides in an Exhaust Gas

A removal efficiency of nitrogen oxide and hydrothermal stability by the prepared catalytic reactor were measured by the same manner as Example 1, and the results are shown in FIG. 1.

FIG. 1 is a graph showing a removal ratio of nitrogen monoxide according to a reaction temperature according to Example 1 of the present invention and Comparative Example 1, respectively.

In FIG. 1, ○ represents the initial activity (Fresh) of the catalytic reactor prepared by washcoating the ceramic fiber carrier treated by hydrothermal reaction according to Example 1, and Δ represents the initial activity (Fresh) of the catalytic reactor prepared by washcoating the ceramic fiber carrier which is not treated by hydrothermal reaction according to Comparative Example 1. Also, ● represents the hydrothermal stability of the catalytic reactor prepared by washcoating the ceramic fiber carrier treated by hydrothermal reaction according to Example 1, i.e. the activity according to the long term operation (After Aging), and ▲ represents the hydrothermal stability of the catalytic reactor prepared by washcoating the ceramic fiber carrier which is not treated by hydrothermal reaction according to Comparative Example 1, i.e. the activity according to the long term operation (After Aging), which is represented by the removal ratio (%) of nitrogen oxide according to the reaction temperature.

From FIG. 1, it could be appreciated that Example 1 (After Aging) or the catalytic reactor prepared by hydrothermal-treating the ceramic fiber carrier for 24 hours at 700° C. in the presence of 10% of steam and washcoating the ceramic fiber carrier treated by hydrothermal reaction, has a hydrothermal stability superior to that of Comparative Example 1 (After Aging) or the catalytic reactor prepared by washcoating the ceramic fiber carrier which is not treated by hydrothermal reaction.

Further, from the fact that the catalytic reactor with ceramic fiber carrier treated by hydrothermal reaction remains its initial nitrogen oxide removal activity, it can be appreciated that the hydrothermal stability is enhanced.

INDUSTRIAL APPLICABILITY

Since the catalyst prepared according to the present invention has excellent hydrothermal stability, degradation of the activity of the catalyst which can be caused by a long term operation is restricted and the initial activity remains excellent. Also, by employing the catalyst of which hydrothermal stability remains excellent for a long time to remove nitrogen oxides in an exhaust gas, the removal ratio of the nitrogen oxides can be greatly enhanced.

The invention claimed is:

1. A catalyst for removing nitrogen oxides from exhaust gas, comprising
    a hydrothermal reaction treated ceramic fiber carrier, and
    a washcoat comprising a vanadia/titania catalyst coated on the hydrothermal reaction treated ceramic fiber carrier,
    wherein the hydrothermal reaction is conducted under air atmosphere comprising 0.1 to 50% of steam at a temperature of 300 to 900° C., and
    wherein the ceramic fiber carrier comprises 1 to 40% by weight of the carried washcoat.

2. The catalyst for removing nitrogen oxides as set forth in claim 1, wherein the vanadia/titania catalyst comprises 1 to 3% by weight of vanadium.

3. The catalyst for removal of removing nitrogen oxides as set forth in claim 1, wherein the hydrothermal reaction is treated for 1 to 72 hours.

4. The catalyst for removing nitrogen oxides as set forth in claim 1, wherein a removal ratio of the nitrogen oxides using the catalyst is in the range of 80 to 95% at a reaction temperature of 300 to 500° C.

5. A method for removing nitrogen oxides from an exhaust gas comprising the following steps of:
    mixing the exhaust gas comprising nitrogen oxides with a reducing agent; and
    removing the nitrogen oxides by reduction reaction generated during passing the mixture through a catalytic reactor containing a catalyst of claim 1.

6. The method as set forth in claim 5, wherein the reducing agent is ammonia or urea.

7. The method as set forth in claim 5, wherein the reduction reaction is conducted at a space velocity of 100 to 100,000 $h^{-1}$ and a temperature of 150 to 600° C.

8. The method as set forth in claim 5, wherein a removal ratio of the nitrogen oxides using the catalyst for removing nitrogen oxides is in the range of 80 to 95% at an oxidation-reduction reaction temperature of 300 to 500° C.

9. A method for preparing a catalyst for removing nitrogen oxides comprising:
    preparing a ceramic fiber carrier treated by hydrothermal reaction;
    preparing an aqueous washcoat solution by mixing a vanadia/titania catalyst slurry and an aqueous binder solution; and
    preparing a washcoated ceramic fiber carrier by impregnating the ceramic fiber carrier treated by hydrothermal reaction in the aqueous washcoat solution.
    wherein the hydrothermal reaction is conducted under air atmosphere comprising 0.1 to 50% of steam at a temperature of 300 to 900° C., and
    wherein the washcoated ceramic fiber carrier comprises 1 to 40% by weight of the carried washcoat.

10. The method as set forth in claim 9, wherein the hydrothermal reaction is conducted for 1 to 72 hours.

11. The method as set forth in claim 9, wherein the ceramic fiber carrier is prepared by (a) firstly coating a ceramic green paper prepared by using a slurry solution comprising ceramic fibers having a length of 0.1 to 10 mm with an aluminum silicate solution and drying the coated ceramic green paper; (b) secondly coating the dried ceramic green paper with an aluminum phosphate solution and drying the coated ceramic green paper; and (c) calcinating the ceramic green paper secondly coated and dried in (b).

12. The method as set forth in claim 9, wherein the vanadia/titania catalyst comprises 1 to 3% by weight of vanadium.

13. The method as set forth in claim 9, wherein the vanadia/titania catalyst slurry and the aqueous binder solution are mixed in a weight ratio of 1:1 to 1:7.

14. The method as set forth in claim 9, wherein the vanadia/titania catalyst slurry is prepared by mixing the catalyst and distilled water in a weight ratio of 1:1 to 1:7.

15. The method as set forth in claim 9, wherein the aqueous binder solution is prepared by mixing binder and distilled water in a weight ratio of 1:5 to 1:10.

16. The method as set forth in claim 9, wherein the binder is alumina sol.

* * * * *